United States Patent [19]

Candle et al.

[11] Patent Number: 4,857,253
[45] Date of Patent: Aug. 15, 1989

[54] METHOD OF MANUFACTURING A FLUID ACTUATOR FOR BRAKES AND CLUTCHES

[75] Inventors: Richard D. Candle; Robert C. Schisler, both of Akron, Ohio

[73] Assignee: The Goodyear Tire & Rubber Company, Akron, Ohio

[21] Appl. No.: 208,519

[22] Filed: Jun. 20, 1988

Related U.S. Application Data

[62] Division of Ser. No. 22,920, Mar. 6, 1987, Pat. No. 4,773,519.

[51] Int. Cl.$^4$ ............................................. B29C 45/14
[52] U.S. Cl. .................................. 264/130; 264/135; 264/242; 264/263; 264/264
[58] Field of Search ............... 264/130, 135, 242, 263, 264/264

[56] References Cited

U.S. PATENT DOCUMENTS 2,444,394  6/1948  Arnold .............................. 264/135
4,489,018 12/1984  Ball ...................................... 264/25
4,736,510  4/1988  Jörg et al. ......................... 264/130

FOREIGN PATENT DOCUMENTS 691997  1/1953  United Kingdom ............... 264/264

Primary Examiner—Jan H. Silbaugh
Assistant Examiner—Nicholas Krisch
Attorney, Agent, or Firm—Marc R. Dion, Sr.

[57] ABSTRACT

A method of manufacturing a closed, hollow toroidal structure having a rigid internal annular plate includes treating one annular surface of the plate with a release coating, applying to the other annular surface of the plate an adhesion promoting coating and positioning the plate within a mold having a generally toroidal internal cavity. Next, a fluid conduit is juxtaposed partially within the internal cavity of the mold adjacent to the annular plate and partially outside the internal cavity of the mold. The mold cavity is then filled with an elastomer followed by curing under heat and pressure.

5 Claims, 3 Drawing Sheets

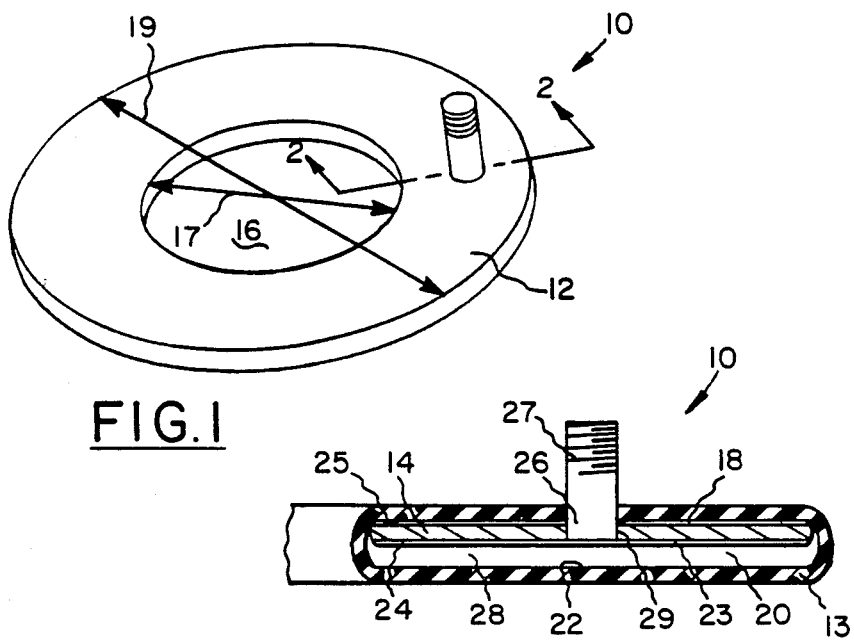
FIG.1
FIG.2
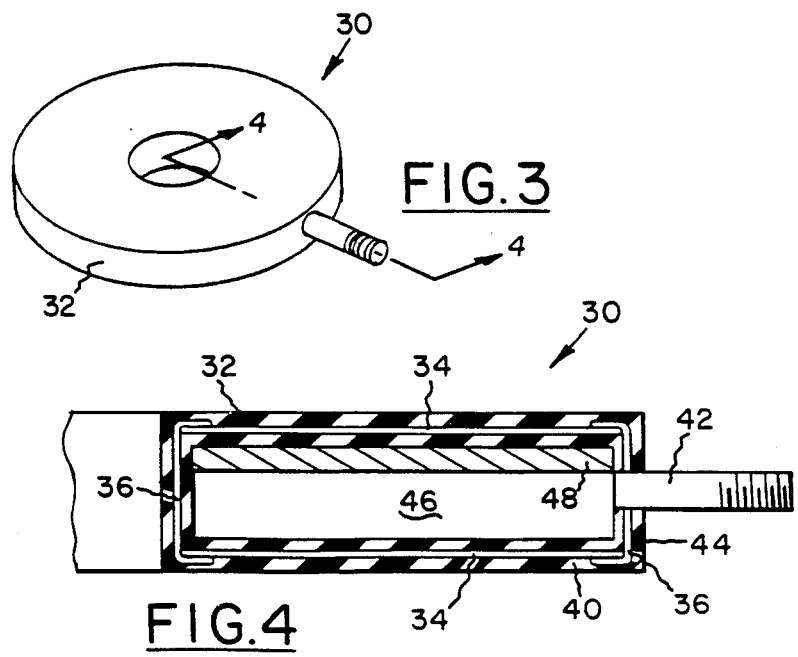
FIG.3
FIG.4

METHOD OF MANUFACTURING A FLUID ACTUATOR FOR BRAKES AND CLUTCHES

This is a divisional of application Ser. No. 22,920, filed on Mar. 6, 1987, now U.S. Pat. No. 4,773,519.

This invention relates to toroidal actuators for use with hydraulic fluids or compressible gases. In particular the toroidal actuator is adapted for use with brake and clutch mechanisms in which a shaft must pass through the actuator mechanism.

Brake assemblies which utilize conventional hydraulic cylinders as actuators suffer from durability problems relating to the wearing of sliding seals which result in leakage around the seals and eventual failure of the mechanism. Devices utilizing mechanical spring linkages to actuate the brake or clutch friction material are complex mechanical linkages which are subject to lubrication and maintenance problems as well as damage in the ordinary course of use. An aspect of this invention is to provide a thin, flat toroidally shaped inflatable device suitable for mounting around a central shaft which produces actuating forces in a direction parallel to the shaft. The advantages of utilizing the fluid actuator of this invention in a clutch and brake apparatus are many fold: The rubber actuator can provide very large activation force over a small stroke: the actuator is very thin and can fit into tight space envelopes; the actuator can be used with any conventional hydraulic or pneumatic fluid: can operate at very high pressures.

BRIEF DESCRIPTION OF THE DRAWINGS

FIG. 1 is a perspective view of a flat toroidal actuator of the invention.

FIG. 2 is a radial cross-section of the flat toroidal actuator of FIG. 1.

FIG. 3 is an alternative embodiment of the invention in which the toroidal actuator is disc shaped.

FIG. 4 is a radial cross-section of an actuator of FIG. 3.

BRIEF DESCRIPTION OF THE INVENTION

Figure 5:
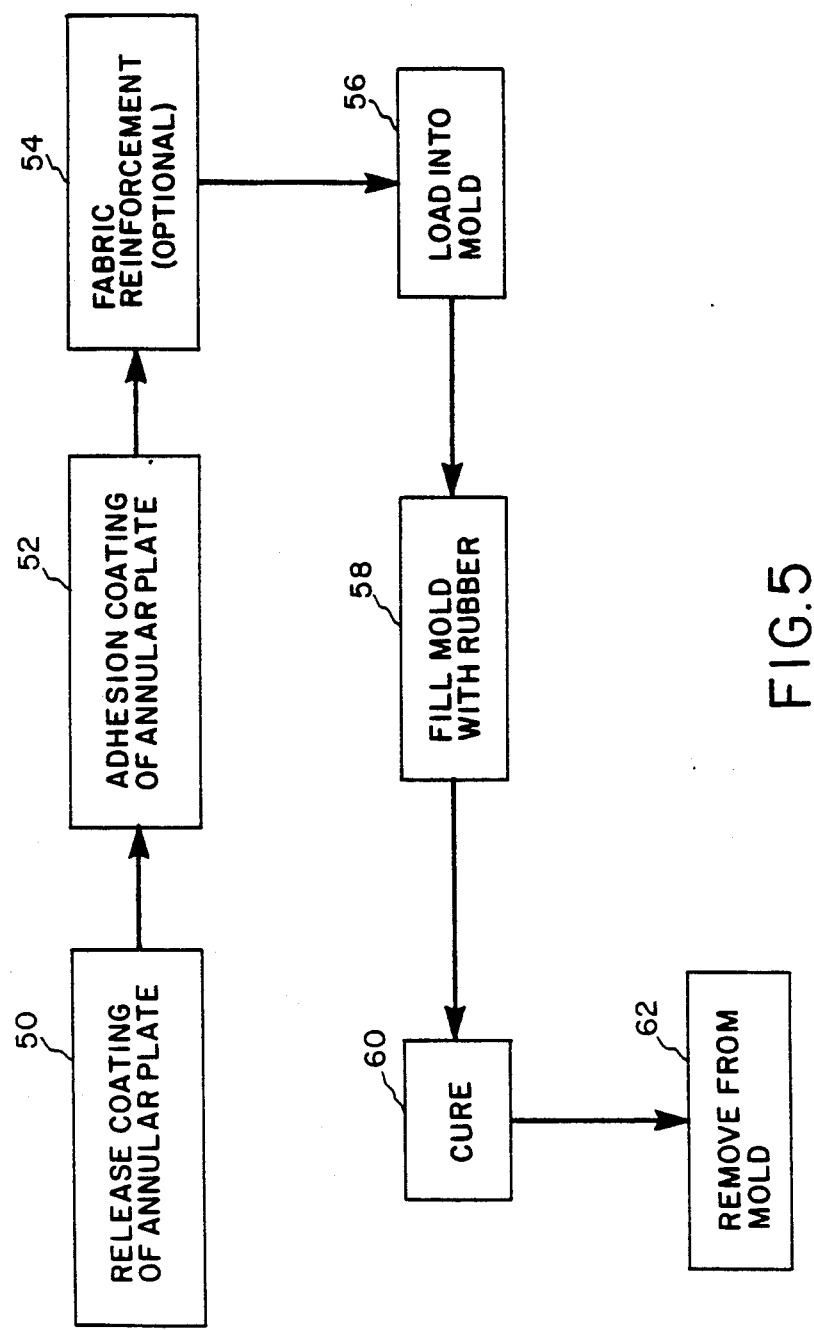
FIG. 5 is a simplified schematic of a process of manufacturing the toroidal actuators of the invention.

The advantages of the invention can be realized in a fluid actuator comprising: a toroidal hollow rubber diaphragm with an open center passageway and having an interior working cavity bounded by an interior surface; a rigid annular plate with first and a second annular surface having a center bore with a diameter slightly greater than the diameter of the open center passageway of said toroidal diaphragm, said plate being firmly adhered to the interior surface of said toroidal rubber diaphragm solely on said first annular surface of said annular plate, said second annular surface of said annular plate being unattached to the interior surface of said rubber diaphragm and thereby forming one surface of said working cavity of said diaphragm; a fluid port forming a passage from said working cavity through said rubber diaphragm.

Another aspect of the invention is use of the actuator in a power transmission device comprising: a housing; a driving member positioned on the exterior of said housing; a driven member extending through said housing; a means for frictionally engaging said driving member to said driven member positioned within said housing; a means for frictionally disengaging said driving member from said driven member positioned within said housing; a fluid actuator having a toroidal hollow rubber diaphragm with an open center passageway and having an interior working cavity bounded by an interior surface: a rigid annular plate with first and a second annular surface having a center bore with a diameter slightly greater than the diameter of the open center passageway of said toroidal diaphragm, said plate being firmly adhered to the interior surface of said toroidal rubber diaphragm solely on said first annular surface of said annular plate, said second annular surface of said annular plate being unattached to the interior surface of said rubber diaphragm and thereby forming one surface of said working cavity of said diaphragm: a fluid port forming a passage from said working cavity through said rubber diaphragm, said actuator having a first position and a second position, said first position being achieved when pressurized fluid is injected through said fluid port into said working cavity to expand said rubber diaphragm to an expanded position, thereby actuating said means for frictionally engaging said driving member with said driven member, said second position being achieved when said pressurized fluid is expelled from said working cavity through said fluid port thereby reducing said diaphragm to a dimension less than said expanded size thereby actuating said means for disengaging said driving member from said driven member.

DETAILED DESCRIPTION OF THE INVENTION

A flattened toroidal actuator 10 useful in the brake and clutch devices according to the invention is shown in isolation in FIGS. 1 and 2 and a disc shaped form 30 in FIGS. 3 and 4. FIGS. 1 and 2 show the flattened toroidal actuator 10 which is composed of a toroidal diaphragm 12 with a central passageway 16 therethrough. The diaphragm is made of a tough elastomeric material capable of withstanding high internal pressures. The diaphragm may optionally include fabric reinforcement and/or may be fiber reinforced. Representative of such materials are synthetic or natural rubbers including styrene butadiene rubber, acrylonitrile (SBR) butadiene rubber (NBR), polyisoprene, polybutadiene, polychloroprene, ethylene propylene diene rubbers (EPR and EPDM), polysulfide, polyurethane, and others of a thermosetting character which require curing or vulcanization to achieve their final tough elastomeric properties. Also representative and useful in some applications would be the many thermoplastic elastomers now conventionally used in place of and in conjunction with thermosetting rubbers. These may include blends of EPDM and polypropylene, commercially available from Monsanto as Santoprene TM, styrene isoprene and styrene butadiene copolymers represented by the commercially available Kraton TM line of elastomers from Shell. Polyvinylchloride (PVC) and thermoplastic urethanes, chlorosulfonated polyethylenes and other halogenated polyolefins are also representative materials. It is noted that the more preferred materials are the thermosetting rubber polymers which are resistant to various hydraulic and other incompressible fluids used in brake and clutch systems such as acrylonitrile butadiene rubber (NBR) and blends of NBR/PVC as well as polysulfides, epichlorohydrin, butyl and halo butyl rubbers and silicone rubber. Most preferred are the NBR polymers due to their good high and low temperature resistance as well as high tensile and modulus properties giving them the ability to resist high internal pressures. A flat rigid annular plate 14 is contained within the hollow elastomeric body 12. The term diaphragm is used herein interchangeably with the term elastomeric body. The plate 14 may be made of any suitably rigid material including metal, reinforced plastic or rigid high temperature resistant thermoplastic materials. Plate 14 is firmly adhered a first annular surface 18 of the actuator 10. Plate 14 includes a central bore 16 corresponding to a center passageway and the plate 14 is of generally equivalent dimensions with regard to inside 17 and outside 19 diameters as the body 12. A working cavity 20 is formed in the interior of the actuator 10 due to the fact that the opposite flattened internal surface 22 of the interior of the elastomeric body 12 is free of any adhesion to the second annular surface which is on the opposite side of surface 18 of the plate 14. A fluid conduit 26 is provided which passes through the wall 13 of the body 12 into the working cavity 20. It connects the working cavity 20 with the external source of pressurized fluid (not shown). The fluid conduit 26 may be fitted with any suitable apparatus including a valve 27 such as a common Schrader or inner tube valve or more complex two-way valves which control the movement into and out of the working cavity 20. In hydraulic-type brake and clutch applications, the source of high pressure incompressible fluid to the fluid conduit 26 would most conventionally be provided by a hydraulic cylinder actuated by the brake or clutch pedal of the particular vehicle or device in which it is installed. Any other known means for providing variable fluid pressure to the working cavity 20 is contemplated to be within the scope of this invention. The working cavity 20, during operation of the actuator 10, is filled with a pressurized, incompressible hydraulic type fluid 28 such as various phosphate esters, mineral oils, etc, which are used in hydraulic applications.

Referring now to FIGS. 3 and 4, a disk-shaped actuator 30 is provided which is in most respects similar to FIGS. 1 and 2, except that the body 32 of the actuator 30 is reinforced with a plurality of fabric layers 34 as well as a plurality of circumferential layers 36 which add additional strength to the rubber matrix 40 and 44 which form the wall of the actuator 30. Alternatively, these reinforcements may be provided in a generally helically wrapped pattern over the toroidal surface. A fluid conduit 42 is also provided through a peripheral surface 44 of the disk-shaped actuator which connects to the working cavity 46 in this configuration. The fabric reinforcements 34 and 36 provide additional reinforcement and resistance to radial stress exerted by the hydraulic fluid in the working cavity 46 during operation of the device in which the actuator 30 is installed. An internal annular plate 48 is provided which is adhered on one flat surface to an interior surface of the body 32. This is one in similar fashion in all respects to the plate 14 of the actuator 10 of FIGS. 1 and 2. The detail will not be repeated here.

The actuators 10 and 30 can be manufactured using a highly efficient automated method which nearly eliminates hand lay-up of materials prior to curing. A primary requirement of the manufacturing method of this invention is to produce a product in which the rubber adheres firmly to one side of the plate and is completely detached and unadhered to the opposite flat side of the plate. Referring now to FIGS. 1 and 2, a preferred method of accomplishing this result is through pretreating the second annular surface 24 of the annular plate 14 with a release coating 23 for preventing sticking of the later applied thermosetting elastomer which forms the body 12 of the diaphragm 11. The release coating can be any material which prevents the adhesion of rubber to metal during the high temperatures and pressures of the curing process. Known materials include a coating of Teflon, polyolefin, silicone or other known release agents or films.

On the first annular surface 18 an adhesion promoting coating 25 is applied to the flat surface capable of promoting intimate adhesion of the metal surface to the later applied thermosetting rubber material. Adhesion promoters may include various isocyanates and RFL type coatings as well as many electro-deposited metallic substrates commonly used in the final preparation of wire for tire reinforcement. A particularly suitable material is marketed by the Lord Corporation under the trademark Chemlok. The Chemlok TM proprietary adhesives promote the adhesion of rubber to metal. Any other suitable adhesion promoting coating can be utilized and the selection of such materials is well known in the art.

The flat annular plate 14 with the adhesion promoting coating 25 on one side and the release coating 23 on the opposite side is then positioned within a mold having a generally toroidally shaped internal cavity with the plate being spaced a predetermined distance from the inside surface of the internal cavity. The predetermined distance is approximately equal to the wall thickness of the diaphragm wall 13. After the plate 14 is positioned within the mold, the internal cavity of the mold is filled with the desired elastomer. Compression molding, injection molding, transfer molding may all be utilized to fill the internal cavity. Most preferred, for the actuator of FIG. 1 which contains no fabric reinforcement, is the injection molding process in which the elastomer is injected through a port connecting the internal cavity of the mold with an extruder which masticates, heats and plasticizes the rubber or elastomer prior to injection. If a toroidal actuator 30 is manufactured having fabric layers surrounding the annular plate 48 a necessary intermediate step prior to filling the internal cavity is to position the desired fabric reinforcement layers 34 and 36 within the internal cavity of the mold around the periphery of the plate 48. Once the fabric is positioned therein, the rubber may be laid in with the fabric. An alternative method is the use of calendared fabric layers 34 and 36 in which thin layers of rubber are applied to the inner and outer surfaces of the fabric to yield a rubber matrix surrounding the fabric layers 34 and 36. These calendared fabric layers are cut to the required dimension and wrapped around the plate 48 and this constitutes the filling step insofar as the rubber is incorporated along with the fabric.

Once the uncured composite has been formed, consisting of the plate, rubber and optional fabric, the mold is sealed and subjected to sufficient heat and pressure to cure the elastomer and form the toroidal actuators 10 and 30. The amount of heat and pressure are quantities which can be determined quite easily by one skilled in the art of manufacturing rubber articles and curing temperatures and pressures vary widely. 250° to 380° F. (120° to 195° C.) is a characteristic range of temperatures for curing various thermosetting rubber polymers, including synthetic and natural rubber. FIG. 5 provides a simplified block schematic number diagram of the process just described in which the reference numbers in parenthesis correspond to the method steps which follow each reference number. Non-parenthetical characters relate back to FIGS. 1 and 2.

In Step (50) the plate 14 is treated on one side 24 with the release coating 23. In step (52), the plate is then treated on the other side 18 with the adhesion promoter 25. The next step (54) is optional, it involves positioning of the fabric layers 34, 36 around the plate 14. In step (56), the plate is then positioned within the mold. In step (58), rubber is injected or placed in the mold. In step (60), the mold and its contents are subjected to heat and pressure. The final step is (62) which is removal of the fully cured actuator from the mold.

The advantage of such a process is that the actuator 10 of FIG. 1 and actuator 30 of FIG. 3 may be manufactured with very little hand labor and can be economically produced by automated manufacturing methods. These methods contrast markedly with the normal methods of manufacturing toroidally shaped articles such as tires in which many, many hand lay-up steps are required for the various layers. The actuator 10 preferably contains no fabric layers, therefore, can be quickly and economically produced using transfer and/or injection molding techniques. The release coating side of the plate prevents the rubber from sticking to the plate and the unadhered periphery 22 of the internal cavity 20 of the actuator 10 forms the working fluid cavity through the ingress of fluid through the fluid port 26. It is to be noted that in the manufacturing steps, the fluid conduit 26 is positioned within the mold cavity prior to injection of the elastomer into the mold. It can be envisioned, however, that such a valve could conceivably be added after molding although the working pressure range of such a device could not be as wide as one in which the fluid conduit 26 is integrally surrounded by the rubber elastomer prior to curing. The preferred positioning of the fluid conduit 26 is such that it exits the wall 13 of the actuator 10 on the side 18 of the plate 14 which is firmly adhered to the rubber wall 13. This eliminates the possibility of leakage occurring around the fluid conduit 26. It is noted that in this configuration, the plate must contain a bore 29 through its thickness complimentary to the dimension of the conduit 26.

Figure 6:
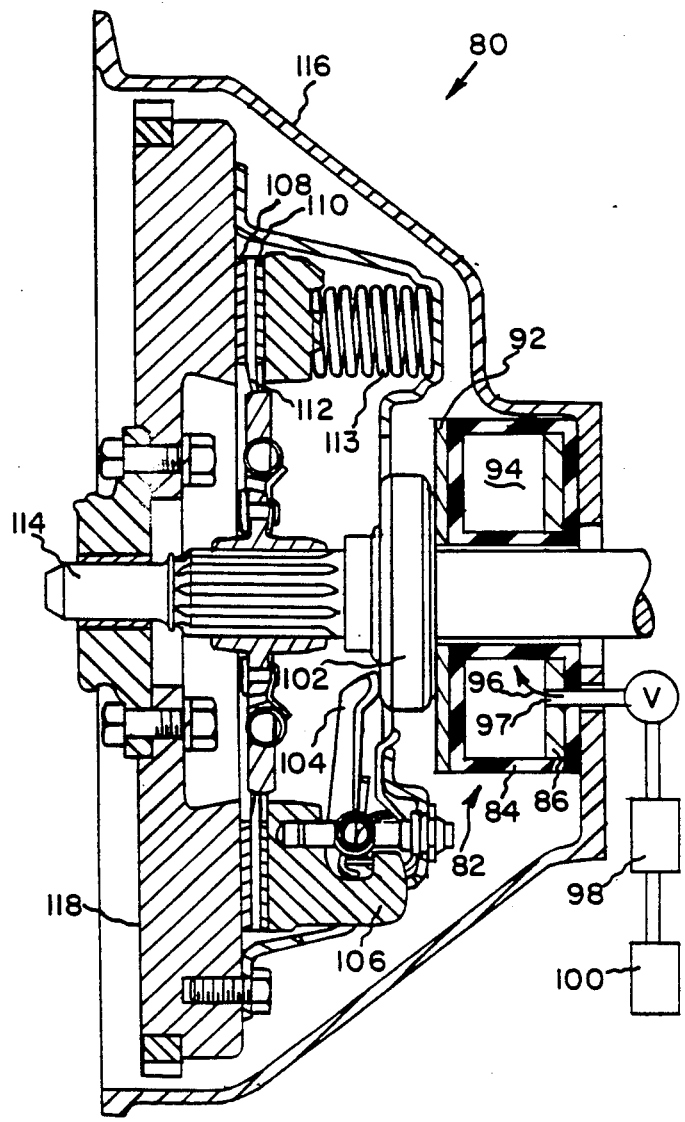
FIG. 6 is a cutaway view of a clutch apparatus in which the toroidal actuator of the invention is utilized to disengage the clutch.

FIG. 6 is a clutch apparatus 80 in which the toroidal actuator of the invention is utilized to disengage the drive shaft 114 and driven plate 112 from a rotational power source such as an engine which is external of the housing 116 and connected to the driving member, namely the flywheel 118. Such clutches are common in most automotive and truck applications.

The clutch 80 is activated using a flattened toroidal actuator similar in all respects to the actuators 10 and 30 shown in FIGS. 1 through 4. The actuator 82 includes a toroidal diaphragm 84 of thermosetting elastomer optionally reinforced with fabric reinforcement. A flat rigid annular plate 86 is positioned within the diaphragm 84 adjacent to one side of the inner peripheral surface of the diaphragm 84. The actuator 82 acts against a pusher plate 92 positioned axially distal from the annular plate 86. The working cavity 94 within the diaphragm 84 is filled with pressurized fluid 96 supplied externally of the actuator 82 through a fluid pathway 97 which connects to a hydraulic master cylinder 98 which is in turn connected to an activation means such as a clutch pedal 100. When the clutch mechanism is to be activated, the master cylinder 98 is actuated by the clutch pedal 100 and forces hydraulic fluid 96 into the working cavity 94 through the port 97 and moves the pusher plate 92 against the throw-out bearing 102 which activates the release lever 104 which axially moves the pressure plate 106 away from contact with the friction pads 108 and 110 thereby disengaging the driven plate 112 and the driven shaft 114 from the flywheel 118. All of this mechanical action is conventional within a standard automobile type clutch. When the clutch mechanism is to be reversed, the hydraulic pressure in the master cylinder 98 is released allowing the release of hydraulic pressure and the exit of portions of the hydraulic fluid from the working cavity 94 of the actuator 82. The hydraulic fluid is forced out of the diaphragm 84 by the action of the pressure spring 113 which returns the pressure plate 106 and throw-out bearing 102 to their original engaged position thereby axially moving the pusher plate 92 toward the annular plate 86 of the actuator 82 which is fixedly attached to the housing 116. The fly wheel 118 transfers smooth rotational power from the rotational power source which is external to the bell housing 116. Most elements are bearing-mounted for free rotation within the housing 116 as is conventional in such clutch assemblies. Many other configurations of clutch or brake-type mechanisms can be envisioned. The actuator 82 of this invention can be utilized in any such clutch mechanisms where relatively small axial displacements are necessary for actuation. The advantages of no seals and no potential hydraulic leakage are carried through in this clutch embodiment.

Many other analogous systems can be envisioned. While certain representative embodiments and details have been shown for the purpose of illustrating the invention, it will be apparent to those skilled in this art that various changes and modifications may be made therein without departing from the scope of the invention.

What is claimed is:

1. A method of manufacturing a closed, hollow toroidal structure having an interior working cavity bounded by an interior surface and a rigid internal annular plate adhered on an annular surface thereof to said interior surface comprising:

(a) treating a first annular surface of said rigid annular plate with a release coating for preventing sticking of a later applied elastomer to said plate:

(b) applying to a second annular surface of said rigid annular plate adhesion promoting coating capable of intimately adhering said plate to said later applied elastomer;

(c) positioning said plate within a mold having a generally toroidal internal cavity, said plate being medially positioned within said cavity;

(d) placing a fluid conduit having an internal and an external end within said cavity such that said internal end extends into said internal cavity of said mold substantially adjacent to said first flat annular surface of said flat annular plate, and said external end of said conduit extends outside of said toroidal internal cavity of said mold:

(e) filling said toroidal internal cavity with an elastomer; and (f) subjecting said elastomer simultaneously to sufficient heat and pressure to cure said elastomer and adhere it to said second annular surface while said first annular surface remains unattached to said elastomer, thereby forming said closed, hollow toroidal structure with said interior working cavity communicating with said fluid conduit.

2. A method according to claim 1 wherein said filling is accomplished by injection molding said elastomer through an injection port provided in said mold connecting to said internal cavity.

3. A method according to claim 1 wherein said filling step further comprises the steps of heating an elastomer; and extruding said heated elastomer into said cavity through an injection port provided in said mold.

4. A method according to claim 1 wherein said filling step further comprises laying into said internal cavity a predetermined amount of said elastomer on opposite sides of said annular plate.

5. A method according to claim 1 further comprising the step of laying in a plurality of fabric layers around said annular plate prior to the step of filling said cavity with elastomer.

* * * * *